(12) United States Patent
Forsythe et al.

(10) Patent No.: US 7,370,023 B1
(45) Date of Patent: May 6, 2008

(54) SIMULATION OF HUMAN DECISION MAKING

(75) Inventors: J. Chris Forsythe, Sandia Park, NM (US); Ann E. Speed, Albuquerque, NM (US); Sabina E. Jordan, Albuquerque, NM (US); Patrick G. Xavier, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 676 days.

(21) Appl. No.: 10/426,105

(22) Filed: Apr. 29, 2003

Related U.S. Application Data

(60) Provisional application No. 60/416,298, filed on Oct. 3, 2002.

(51) Int. Cl.
G06F 17/00 (2006.01)
G06N 5/02 (2006.01)

(52) U.S. Cl. .............................. 706/46; 706/12; 706/14
(58) Field of Classification Search .................. 706/46, 706/12, 14
See application file for complete search history.

(56) References Cited

U.S. PATENT DOCUMENTS

| | | | |
|---|---|---|---|
| 6,463,328 B1 * | 10/2002 | John | 607/45 |
| 6,658,369 B2 * | 12/2003 | Pletser et al. | 702/181 |
| 2002/0042691 A1 * | 4/2002 | Pletser et al. | 702/181 |

OTHER PUBLICATIONS

Wolfgang Klimech, Memory processes, brain oscillations, and EEG synchronization, Aug. 1996, University of Salzburg, Elsevier, 0167-8760/96, 61-100.*

G. Klein, An overview of naturalistic decision making applications, in Naturalistic Decision Making, Lawrence Earlbaum, Mowah, NJ (1997), pp. 49-59.

C. Forsythe et al., "Surety of human elements of high consequence systems: An organic model", Proceedings of the IEA 2000/ HFES 2000 Congress, 3-839-3-842.

T. E. Goldsmith et al., "Assessing structural knowledge", Journal of Educational Psychology, 83(1), (1991), pp. 88-96.

P. MacNeilage, "The frame/content theory of evolution of speech production", Behavioral and Brain Sciences, 21, (1998) pp. 499-546.

W. Klimesch, "Memory processes, brain oscillations and EEG synchronization", International Journal of Psychophysiology, 24, (1996), pp. 61-100.

B. K. Britton & P. Tidwell, Cognitive structure . . . , In P.D. Nichols, S.F. Chipman & R.L. Brennan (Eds) Cognitively Diagnostic Assessment, Erlbaum, Hillsdale, NJ, 251-278.

M.A. Wheeler, D.T. Stuss, & E. Tulving, "Toward a theory of episodic memory", Psychological Bulletin, 121(3), (1997) pp. 331-354.

(Continued)

*Primary Examiner*—Joseph P Hirl
(74) *Attorney, Agent, or Firm*—Madelynne J. Farber

(57) ABSTRACT

A method for computer emulation of human decision making defines a plurality of concepts related to a domain and a plurality of situations related to the domain, where each situation is a combination of at least two of the concepts. Each concept and situation is represented in the computer as an oscillator output, and each situation and concept oscillator output is distinguishable from all other oscillator outputs. Information is input to the computer representative of detected concepts, and the computer compares the detected concepts with the stored situations to determine if a situation has occurred.

16 Claims, 3 Drawing Sheets

OTHER PUBLICATIONS

K. Hunter, W. Hart, J. C. Forsythe, "A Naturalistic Decision . . . ", 9th Conference on Computer Generated Forces and Behavior, Orlando, FL, May 16, 2000.

L. S. Ehrhart et al., "Collaborative Prototyping Approaches for ICU Decision Aid Design", Proceedings AMIA Symp. 1999: 750-4.

P. Johnson-Laird, Mental Models: Toward a Cognitive Science of Language, Interference, and Consciencness, Harvard Univ. Press, 1983 (chprs 1,2,6,7 & 15).

* cited by examiner

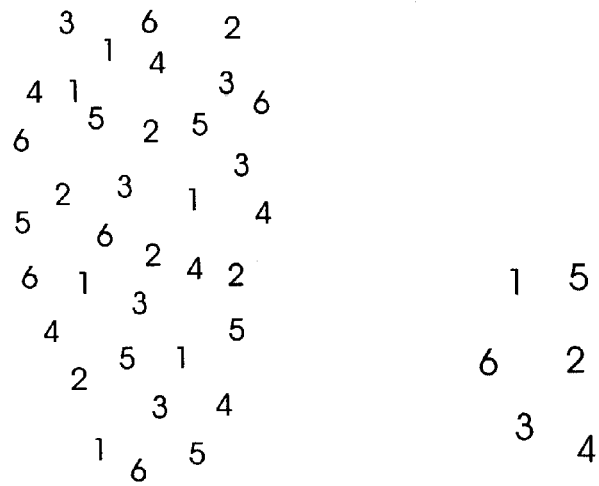
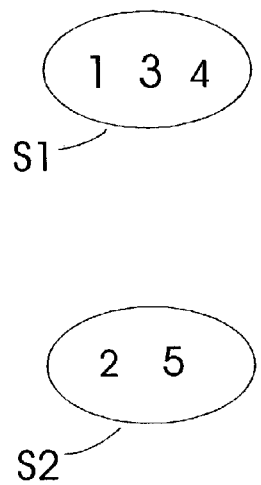
Fig. 1A  Fig. 1B  Fig. 1C
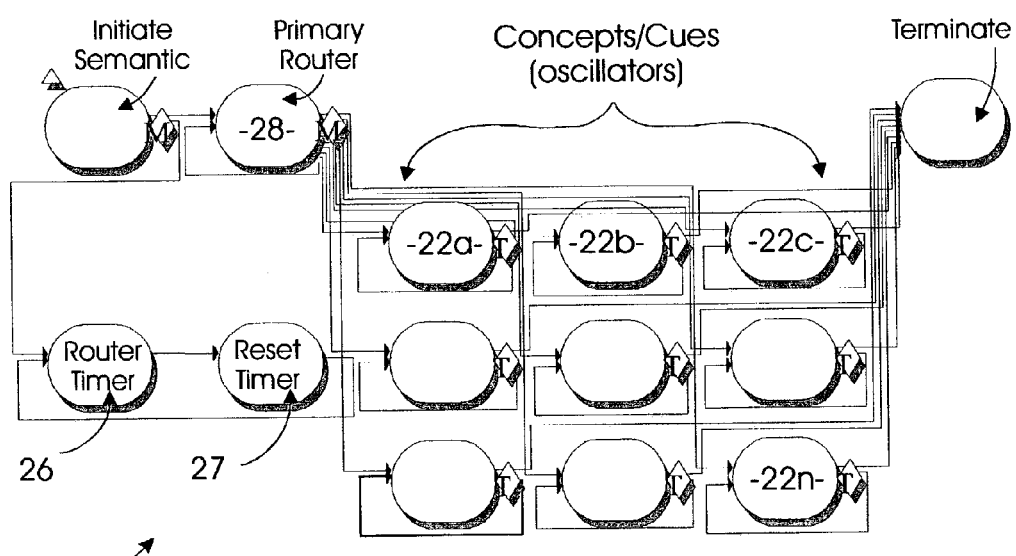
Fig. 3

SIMULATION OF HUMAN DECISION MAKING

CROSS REFERENCE TO RELATED APPLICATIONS

This application claims the benefit of Provisional Application No. 60/416,298, filed Oct. 3, 2002.

The United States Government has rights in this invention pursuant to Department of Energy Contract No. DE-AC04-94AL85000 with Sandia Corporation.

BACKGROUND OF THE INVENTION

Applications for cognitive systems roughly fall into three classes: (1) synthetic humans for simulation and training; (2) various augmented cognition solutions such as those employing representations of expert or user cognitive models; and (3) intelligent control processes including adaptive interfaces. In each case, a computational model(s) of human cognitive processes and or knowledge representation(s) is a basic ingredient to the cognitive system. Tools enabling development of cognitive systems, including the constituent models of cognitive processes, are a central feature of the proposed development environment.

To date, there has been limited application for human modeling and simulation technologies. In general, attention to visual graphics and computational algorithms has dominated concern for behavioral realism. Nonetheless, various camps have made good progress in the computational representation of basic cognitive processes. However, there has been marginal progress toward representations that incorporate the influence of organic factors on behavior (i.e., arousal, fatigue, etc.). It has been a goal to develop a comprehensive framework that encompasses the requisite cognitive processes, but also incorporates organic factors that range from the microscopic (e.g., metabolic, pharmacological, etc.) to the macroscopic (i.e., culture) in a parsimonious fashion.

Two earlier projects contributed to the initial conceptualizations for the human emulator. First, in developing the behavior model for a small unit combat simulator, we sought an instantiation of human naturalistic decision making theory within the context of an agent-based computer simulation. This instantiation utilized Klein's Recognition Primed Decision Making (RPD) model with emphasis on Level 1 decision making. (See G. Klein, "An overview of naturalistic decision making applications, in *Naturalistic Decision* Making, Lawrence Earlbaum, Mowah, NJ (1997), pp. 49-59.) According to RPD, an expert decision maker commits their resources to evaluating the situation and through this evaluation, patterns are detected that lead to recognition that the current situation is analogous to situations that are known from past experience. The appropriate course of action is implicit in recognition of the situation. The instantiation of this concept involved the representation of environmental cues and relevant knowledge in a manner that accommodates pattern recognition. Patterns are associated with known situations (i.e., tactics) and once there is a match between the ongoing situation and a known situation, generic scripts are employed to direct agent behavior.

Secondly, within a systems engineering/safety context, Forsythe and Wenner (2000) have advanced an organic model to account for human influences on engineered systems. (See C. Forsythe et al., "Surety of human elements of high consequence systems: An organic model", *Proceedings of the IEA* 2000/*HFES* 2000 Congress, 3-839-3-842.) This model challenges physical and computational science-based approaches through its emphasis on an organic systems perspective. Specifically, it is asserted that due to human influences, engineered systems are inherently organic and will exhibit properties of organic systems. These properties have been described and provide a basis for predicting aberrant behavior of engineered systems.

Early in development, it was realized that a purely psychological model would be inadequate for representing the influence of organic factors on cognitive behavior. There is enormous ambiguity in basic terminology (e.g., stress, arousal) and without a representation of underlying mechanisms, the scope and predictive capabilities would be severely limited. However, many facets of cognitive behavior (e.g., knowledge representation) are well described by psychological models (See T. E. Goldsmith et.al., "Assessing structural knowledge", *Journal of Educational Psychology*, 83(1), (1991), pp, 88-96.)

Consequently, this invention utilizes a two-tiered approach in which knowledge is represented using a psychological model, and a separate physiology-based model serves as the engine that drives a psychological model. The fact that knowledge is not directly represented in the neural (i.e., physiological) model distinguishes this design from neural net and connectionist approaches, yet facilitates representation of the vast quantities of knowledge essential to a realistic emulation.

The mapping of the psychological to the physiological model is critical. We retain the concepts embodied by Recognition Primed Decision Making. This includes a separate representation of individual situational elements, pattern recognition and activation of schema-like representation of known situations. Frame/Content theory provided an initial bridge. This theory asserts that the representation of individual elements of content within a structural or contextual frame is a basic organizing principle of the neural system (See P. MacNeilage, "The frame/content theory of evolution of speech production", *Behavioral and Brain Sciences*, 21, (1998) pp. 499-546.) Examples include figure/ground relationships in perception, syntax and semantics in linguistics, and differential motor specialization for stabilization and manipulation. Applying frame/content theory, individual elements of a situation represent content, whereas situation schema provide an interpretive frame.

Further extension involves mapping these ideas to the model of memory processes proposed by Wolfgang Klimesch and colleagues. (See W. Klimesch, "Memory processes, brain oscillations and EEG synchronization", *International Journal of Psychophysiology*, 24, (1996), pp. 61-100.) Two phenomena have been described. First, in the absence of intrinsic or extrinsic stimulation, regions associated with semantic memory exhibit synchronous activation in the high alpha (10-13 Hz) bandwidth. It is suggested that semantic memory processes involve the activation of numerous localized neural assemblies. These assemblies oscillate in phase with pulses from a pacemaker until stimulated, at which time activation increases and assemblies begin to oscillate independent of the pacemaker. At this point, there is desynchronization. In contrast, episodic processes exhibit a completely different profile. Specifically, processing demands lead to increased synchronization in the theta (4-7 Hz) bandwidth. This pattern of activation is consistent with oscillation of a single distributed neural assembly.

The cognition studies presented above relate to humans. This invention uses these teachings and other features in a computer model.

This approach to Cognitive Systems may be distinguished from common AI-based and expert systems due to an emphasis on human-like, non-deterministic situation recognition processes, as opposed to reasoning through logical and/or rule-based operations. A primary objective has been to attain a machine emulation of human naturalistic decision making, including the influence of individualized factual and experiential knowledge. These developments are believed essential to attaining more realistically human-like synthetic entities for simulation-based analysis and training. However, these capabilities also enable development of systems in which machines are endowed with human-like cognitive representations, allowing human-machine interactions to move a step closer to human-human interactions.

SUMMARY OF THE INVENTION

It is an object of this invention to simulate cognitive processes by which humans interpret situations using an oscillating systems framework.

To achieve the foregoing and other objects, and in accordance with the purpose of the present invention, as embodied and broadly described herein, the invention may comprise defining a plurality of concepts related to a domain and a plurality of situations related to the domain, where each situation is a combination of at least two of the concepts. Each concept and situation is represented in the computer as an oscillator output, and each situation and concept oscillator output is distinguishable from all other oscillator outputs. Information is input to the computer representative of detected concepts, and the computer compares the detected concepts with the stored situations to determine if a situation has occurred.

Additional objects, advantages, and novel features of the invention will become apparent to those skilled in the art upon examination of the following description or may be learned by practice of the invention.

BRIEF DESCRIPTION OF THE DRAWINGS

The accompanying drawings, which are incorporated in and form part of the specification, illustrate an embodiment of the present invention and, together with the description, serve to explain the principles of the invention.

FIG. 1 illustrates the role of oscillators in this invention.

FIG. 3 shows a computational representation of cues in an embodiment of FIG. 1.

DETAILED DESCRIPTION OF THE INVENTION

The concept upon which this invention is based is illustrated in FIGS. 1A, 1B and 1C.

To understand this Figure, and the invention, a few basic definitions are presented: a 'domain' is the problem under consideration. "What type of eating establishment has been detected?" is an example of a domain. A 'concept', or 'cue', is one fact about the domain. A "waitperson on roller skates in the parking lot" is a cue about the type of eating establishment. And a 'situation' is formed from a combination of cues to describe one of the possible choices in the domain. "Throw money to salesman and have food thrown to you" is a situation indicative of eating at a baseball stadium. However, the granularity of concepts and situations may change depending on the domain (e.g., "presence of waitperson" could become a cue).

FIG. 1A models neural activity of the brain where individual neurons are represented by numerical digits, with each number 1-6 representing a collection of neurons that are temporally synchronized because they are focused on an activity, such as a concept or cue, that uses those neurons. In an ideal computer simulation, each neuron of a brain would be represented in the computer by an oscillator that has a nominal output synchronized with the subject's α bandwidth of brain waves when the neuron is not stimulated, and a more vigorous output that is phase-locked with other related neurons (e.g. all the "1's") when it is stimulated. However, such an approach is very difficult to emulate in a computer because of the computing requirements needed to handle a large number of neurons.

FIG. 1B shows how each concept/cue is represented in the invention as a single oscillator that corresponds to the collection of synchronized neurons from FIG. 1A. When each cue is sensed, one oscillator (1-6) is actuated and oscillates at a frequency close to, but not synchronized with, the α bandwidth. The amplitude and frequency of each oscillator is a function of the strength at which the concept is sensed. This simple diagram does not show associations among cues.

FIG. 1C shows two groups of the cues of FIG. 1B that have been combined to define two situations. The size of each number represents the relative importance of each concept to recognition of the situation. The programmed computer recognizes situation S1 when outputs from oscillators 1, 3, 4 are detected in a proper proportion as indicated by the size of those numbers. Similarly, situation S2 is recognized by the outputs from oscillators 2 and 5. However, not all cues need to be present in order for a given situation to be recognized. Situation S1, for example, could be recognized if cues corresponding to oscillators 1 and 4 are present in the environment, given that they contribute a sufficient amount of evidence to the situation recognition algorithm. The output of each situation is another single oscillator that preferably operates in the 4-7 Hz range of the subject's θ bandwidth of brain waves.

Figure 2:
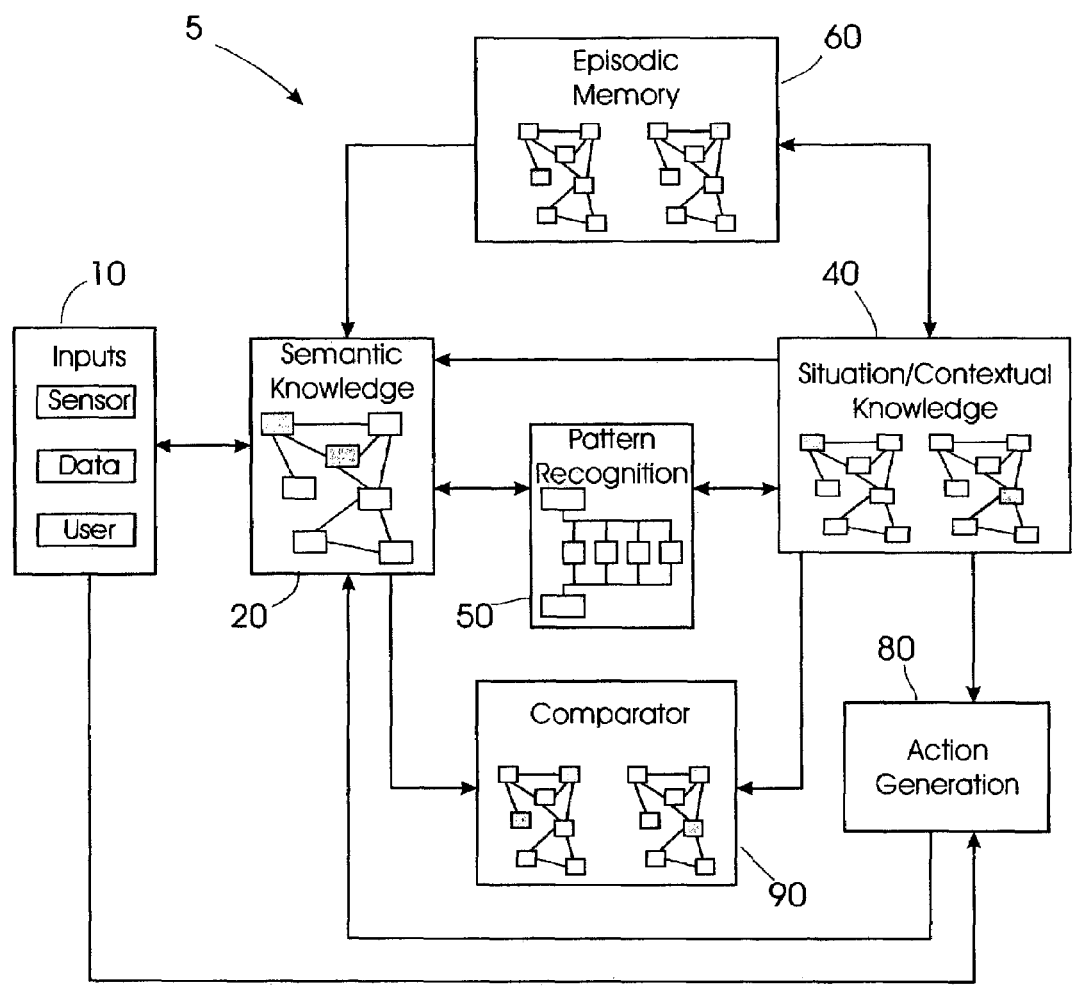
FIG. 2 shows a model of the invention as implemented in a computer.

Model 5, as illustrated in FIG. 2, is based on an oscillating systems account of the neurological processes that give rise to human cognition and provide a link between sub-symbolic and symbolic cognitive processes.

Model 5 includes several key features. First, it receives input from perceptual channels 10 that may be activated by a variety of sensor and data processing devices 12 (e.g., electrical, optical, acoustic, etc.), with the specific makeup depending on the application. Alternatively, the inputs are user-defined, such as in an event simulator, where the system is expected to respond in the manner of an expert to those inputs.

Three types of knowledge are represented in the cognitive framework of FIG. 1: semantic (cues) 20, situational/contextual (situations) 40 and episodic 60. They interact with pattern recognition 50 to provide an output indicative of a situation recognized by the system based on applied inputs.

Semantic knowledge in block 40, consisting of concepts (cues), and the associative relationships between concepts, is represented in an associative network as taught in the context of the human mind. (See, for example, B. K. Britton & P. Tidwell, *Cognitive structure testing: A computer system* for diagnosis of expert-novice differences, In P. D. Nichols, S. F. Chipman & R. L. Brennan (Eds) Cognitively Diagnostic Assessment, Erlbaum, Hillsdale, NJ, 251-278.) Nodes are assigned associative links to other nodes. In implementation, nodes are modeled as oscillators with activation levels that exhibit frequency and amplitude characteristics. Nodes may be activated through either bottom-up (i.e., perceptual) or top-down (i.e., situational knowledge) processes. If sufficient, activation may spread to other associated concepts.

Situational/contextual knowledge 40 is represented as a collection of situations or contexts as taught by P. Johnson-Laird, "Mental models: Toward a cognitive science of language, inference, and consciousness", Cambridge, Mass.: Harvard Univ. Press (1983), and others, where each situation (called a 'schema' by Laird) associated with a pattern of activation. When a pattern (as taught by Klein) is recognized, there is an awareness that corresponds to activation of the situation, and associated knowledge, and a general, although sometimes implicit, comprehension of ongoing events.

The situations and cues can be populated for the domain being emulated by interviewing subject matter experts (SMEs). For example, if the domain is the recognition of types of restaurants, SMEs may define situations such as: (a) sit down and place order with wait person; (b) place order at counter and have food brought to you; (c) place order at counter and pick-up food to eat at table; (d) place order at counter for take-out; and (e) eat in car. Situations (c) and (e) are typical of a fast-food restaurant, while situation (a) is a typical sit-down restaurant. As discussed hereinafter, each of these situations is modeled from set of cues that has been defined in block 20.

SMEs also provide the cues for semantic knowledge in block 20. Such cues might include (1) "Wait to be Seated" sign; (2) menu posted behind a counter; (3) greeter at the door; (4) employees in formal dress; (5) "Pick Up Order Here" sign, and (6) high price of food. Each one of the cues 22 occupies a different node in block 20. The various cues 22 are connected by lines 24 whose thickness represents the strength of the association between connected cues, as discussed hereinafter. For example, there is likely to be a strong relationship among "employees in formal dress", "presence of tables" and "high price of food", and little relationship between "menu posted behind a counter" and "employees in formal dress".

The system of FIG. 2 also includes a Pattern Recognition function 50. Activation of cues in Cue block 20 is observed and situation recognition occurs when a pattern of cues in Situation block 40 is recognized in Pattern Recognition block 50 to correspond to one of the situations in the library of situations. Using the restaurant example, there may be a counter with a menu on the wall behind it, people standing in a line in front of the counter, and people sitting at tables with numbered placards on the tables. On seeing this combination of cues, a pattern may be recognized that it is the type of restaurant where you order at the counter and someone brings your meal to the table. Once the situation has been recognized, there is implicit recognition of the appropriate behavior, which may involve executing a series of scripted actions in Action Generation block 80. Various algorithms known to those skilled in this art may be used to accomplish pattern recognition (e.g. evidence accumulation, neural net, Markov chain, etc.)

The three core components described above should appear in nearly every application of Cognitive Emulation. Other components may be added to provide additional capabilities.

An Episodic Memory block 60 stores a record of the activation of core components, as well as other components. (See M. A. Wheeler, D. T. Stuss, & E. Tulving, "Toward a theory of episodic memory", *Psychological Bulletin*, 121(3), (1997) pp. 331-354, for a discussion of episodic memory in humans.) In response to triggering events that may vary with the application, a record is written to episodic memory that contains levels of activation for nodes in associative knowledge and situations in the library of situations. Consistent with the application, the record may also include data such as timestamps and the levels of activation for components other than the core components. Retrieval from episodic memory may involve queries based on specific elements or combinations of elements in the episodic record. For example, episodic memory may be queried to identify past experiences that have involved a snowstorm. Such a query may return multiple records. In some cases, records may be grouped into a series of records representing a specific past episode. The specific episode that is recalled will depend on the contents of the episodic record with there being alternative approaches for specifying which record(s) is recalled in response to a given query.

In addition to retrieval through queries, episodic memory may supplement situation recognition. Conditions may exist that do not correspond to any situation in the library of situations. In this case, with some applications, episodic memory may be searched to identify any past experiences that correspond to ongoing conditions. Query mechanisms would be employed and the factors present in the current condition (e.g. cues that are present) would serve as the query terms. Retrieval of the episode(s) corresponding to ongoing conditions would then provide the basis for situation recognition. In this case, there may be no situation in the library of situations for a "Take-Out-Taxi" service that will go the restaurant of my choice and bring a meal to my home, but a search through episodic memory may retrieve multiple instances of using pizza delivery and this may be sufficient to interpret the situation.

Top-down expectations serve as an optional feature, although not necessarily a separate component. Situations in the library of situations in block 40 may be assigned expectations. These expectations may consist of cues in block 20 that are either expected to accompany the situation or not expected to accompany the situation. For example, after realizing that the restaurant is one where the host/hostess seats diners at a table and a waiter/waitress takes their order, it is expected that someone will provide a menu. Consequently, there is a tendency to perceive nearly any binder, sheet of paper, etc. placed in your hands to be a menu. Top-down activation functions by either adjusting activation levels or thresholds for the items effected. In addition to cues in associative knowledge, other components, or their constituents, may be the target of top-down activation exerting either a positive or negative effect.

The Comparator 90 is an optional feature enabling a function that may be described as anomaly detection. Once a situation (s) has been recognized, for the duration that the situation persists, the Comparator responds if an unexpected cue is present or an expected cue is absent. For example, in a restaurant where it is expected that the waiter will bring a menu and take your order, if you are brought a plate of food without having been given a menu or placing your order, these would be anomalous events that would trigger a Comparator. For some applications, the Comparator may require that knowledge be supplied concerning cues that are out-of-context for situations in the library of situations. When the Comparator is triggered, its response may be to focus attention on cue(s) prompting the Comparator response and/or to adjust parameters that effect rates at which data is processed. Additionally, the responsiveness of the Comparator may be adjusted, and for some applications, these adjustments may occur dynamically during operation of the system.

Affective processes are optional features that enable the system to differentially respond to certain stimuli (i.e. cues) or states (i.e. situations). Affective processes are synonymous with human emotions, and depending on the application, different combinations of affective processes may be employed. A concept in associative knowledge may have an association to an affective process. When the concept is activated, the associated affective process may be similarly activated. Activation of the affective process may elicit a heightened activation of the concept that caused its activation accompanied by suppression of the activation of all other concepts. For example, the concept "snake" may have an association with an affective process corresponding to the emotion of fear. On observing a snake in a restaurant, there would be activation of the concept for snake, which would trigger an affective response corresponding to fear. The affective response would lead to increased activation of the concept "snake" and dampen activation of all other concepts relating to restaurants. The result would be a focusing of attention onto the fear-inducing stimulus (i.e. the snake) to the exclusion of all other stimuli. This response might also be accompanied by adjustments to parameters that affect the rate of information processing.

A second function that may be accomplished by affective processes is to enable certain learning mechanisms. For instance, an affective process may be employed that corresponds to the emotion of pleasure. When this affective process is activated, various parameters may be modified to adjust associations to this affective process. If the concept "candy" is associated with the affective process for pleasure, and the concepts "candy" and "dog" are simultaneously activated, learning may cause formation of an association between the concept "dog" and the affective response corresponding to pleasure.

Affective processes may have associated behavioral responses. Activation of the affective process corresponding to pleasure may act as a reinforcement promoting behaviors that were temporally contiguous. For example, if candy was received while petting a dog, evoking a response from the affective process corresponding to pleasure, parameters may be adjusted that would have the effect of increasing the incidence of the behavior of petting a dog(s).

Other learning mechanisms may also be employed. For instance, repeated exposure to a stimulus may cause a diminished response to the stimulus (i.e. habituation). Pairing of a stimulus with activation of affective processes may cause parameters to be adjusted so that the stimulus elicits a heightened response (i.e. sensitization).

For applications that utilize Action Generation 80, recognition of a situation serves to elicit corresponding actions. A common means of implementing Action Generation involves the use of scripts. Here, a script is specified that provides a sequential series of actions and corresponding conditions for triggering actions and adapting actions to ongoing circumstances, and once a situation has been recognized, its corresponding script is executed. For example, after recognizing the restaurant is one where you are seated and order at the table, there is a scripted series of actions that are appropriate for this situation.

The variations discussed up to this point enable the basic technology to be adapted to different applications. In addition to the technology described in the above sections, the invention documented here also includes the various applications in which Cognitive Emulation may be utilized. It should be noted that for some applications, the components discussed in the above sections may also be combined in configurations that do not parallel human cognitive processes (e.g. an application may only use one, or more, associative knowledge components) and a key element of the invention concerns the ability to configure these components in modular combinations.

Knowledge Elicitation

'Knowledge elicitation' (KE) is the name of the process used to populate model 5 with information, including semantic knowledge block 20 with cues, contextual knowledge block 40 with situations, and pattern recognition block 80 with patterns indicative of situations. KE involves interacting with subject matter experts (SMEs) to get the knowledge needed for the system.

A preferred KE method creates individualized expert models—one for each subject matter expert who provided input for situations to be recognized within a domain of interest. The creation of a single model that is an amalgamation of several experts is not preferred for a variety of reasons, the most important of which is the fact that knowledge is idiosyncratic between individuals—even for individuals with the same background and same general set of experiences.

A number of techniques may be used to elicit the knowledge for populating the situation and cue blocks of FIG. 1. The following is a generic version of the KE method for populating the cognitive framework. Differences in the technique that are dictated by different types of problems are indicated in the steps.

1. Interview subject matter expert (SME) to begin to identify some of the situations the SME encounters in the domain, and to identify some domain-critical concepts.
2. From these interviews, have the SME create a list of the critical concepts. Reduce this list to no more than 100 of the most critical concepts by having SME select from that list.
3. Identify additional situations by one or more of the following:
    a. Creating a tree structure of the domain where each node represents a situation—this is particularly helpful for well-defined or procedural domains.
    b. Watching the SME behave in the domain and by asking the SME what is going on.
    c. Having the SME watch and guide a novice through a variety of contexts in the domain while explaining to the novice what actions to take and why.
    d. Identifying domain-critical concepts first and then having SMEs respond to a large number of unique combinations of these cues. This method is helpful for very ill-defined or subjective domains.
    The key is to create an environment that is very close to the actual domain of interest and to query the expert in a variety of ways in order to get at both explicit and implicit domain knowledge of different situations.

4. Define situations as combinations of the domain-critical cues. For example, if one situation is labeled "in a fast food restaurant" the situation should be defined in the model as a combination of cues that the SME would use to identify that he was, in fact, in a fast food restaurant 5. After the cue/situation correspondences are determined, identify the quantitative relationship between the cues and situations. Ask the expert to rate the relative importance of each cue to identifying each situation. It can be a complete cue—situation matrix, where a weight is given to each cue for each situation. If this approach is taken, the rating scale should allow negatively diagnostic relationships to be captured. The weights can also be determined by only considering the cues that the expert has explicitly related to the situations.

6. Create the associative network where cues are related to one another semantically by virtue of their co-occurrence (or non-occurrence) across the variety of situations. Ideally the associative network should be based on these co-occurrences. The method for doing this (the co-occurrence method) is presented below. However, if this is not feasible, there are other methods for determining this network (pair rating method, controlled association, modified controlled association, card sorting), which are also detailed below.

a. Co-occurrence method:
      1. Set up a matrix with cues and situations. Populate the matrix with the weights SMEs assigned to each cue/situation pair in step #6 (the data in the Table 1 are not real data).

TABLE 1

| Cues/concepts | Situations | | | |
|---|---|---|---|---|
| | a | b | c | d |
| 1 | −5 | −2 | 3 | 4 |
| 2 | −4 | −3 | 2 | 4 |
| 3 | 5 | 0 | −3 | 0 |
| 4 | 0 | −5 | 0 | −4 |

2. Begin finding the similarity values for each pair of cues by taking the difference of the absolute value of weights in the matrix for each pair of cues. For example, in deriving a similarity index for cues 1 and 3, the difference scores for each situation are:
         a. 5−5=0
         b. 2−0=2
         c. 3−3=0
         d. 4−0=4
      3. Add these numbers together and divide by the number of situations: 6/4 or 1.5.
      4. Populate a "concept relatedness" matrix with that number for each pair of cues:
      5. Then, following the steps above, complete the matrix for all pairs of concepts. The lower the score, the more similar the two concepts should be, and the more strongly they will be linked in the semantic network. Keep in mind that this index takes into account both co-occurrence across situations and similarity of the absolute value of the SME-assigned weights.

TABLE 2

| Concepts | 1 | 2 | 3 | 4 |
|---|---|---|---|---|
| 1 | | 1 | 1.5 | 2.75 |
| 2 | | | 2 | 2 |
| 3 | | | | 4.25 |
| 4 | | | | |

6. This matrix may then be applied to Pathfinder, an algorithm used by psychologists to model semantic associations between concepts in humans and to provide a paradigm for scaling psychological similarity data (see Goldsmith, referenced above). The SMEs are then asked to examine the resulting networks for their subjective evaluation.

There are a couple of important things to note about this method of deriving quantitative relatedness scores between concepts. First, this method takes into account both positive and negative relationships. That is, if two concepts regularly are deemed relatively important to a situation as measured by their respective weights, their relatedness score will reflect it. But, if two concepts are regularly rated in strong opposition to one another (e.g., +5 and −5) across a number of situations, this index will also indicate they are closely related—which they are, but in a negative way. Mutual exclusivity is also a relationship. For example, the score for concepts 1 and 2 (which generally occur together with the same strength in the same direction) is 1.0. The score for concepts 1 and 3 is 1.5—despite the fact that when they do occur together, their weights have opposite valences. The score picks up on the fact that they occur together in 2 of the 4 situations and that the absolute value of the weights is similar.

Second, this method also takes into account whether or not two concepts share importance to situations. From the raw data for concepts 3 and 4, when concept 3 is important for a situation, concept 4 is irrelevant. Not negatively related, but completely nondiagnostic. Similarly, when concept 4 is important, concept 3 is nondiagnostic. Therefore, these concepts are not related and this is reflected in the large value of 4.25

Incidentally, this issue of nondiagnosticity is the reason that the similarity index between cues 1 and 3 is slightly higher than the index between cues 1 and 2. Cues 1 and 2 are similarly diagnostic in all 4 situations, whereas the same is true of cues 1 and 3 in only 2 of the 4 situations.

b. Pair rating method
      1. Create a list of all possible pairs of the critical concepts in the domain
      2. Ask the SME to rate the similarity of each pair on a scale (e.g., from −5 to +5) within the confines of the domain
      3. Provide the resulting matrix to Pathfinder c. Controlled Association:
      1. Using all concepts in the domain, present expert with a single concept, the target.
      2. At the same time, present the remaining concepts in a list and ask the SME to pick out approximately the top 5% of concepts from that list (5% is a very soft constraint) that are most related to the target concept—the target concept will then be linked to the chosen concepts with a weight of 1.
3. Repeat for all concepts—this will produce a completed N×N matrix, where N is the number of domain-critical concepts being considered.
   1. Collapse across the two triangular matrices, summing the corresponding cells. For example, when concept A is the target, if the expert chooses B as being related that will get a score of 1. When the concept B is the target, if concept A is chosen, that cell will then have a score of 1. Collapsing the two triangular matrices will give the A-B pair a score of 2.
   2. Provide the resulting matrix to Pathfinder
d. Modified Controlled Association—this method is a combination of the pair rating method and the controlled association method whereby the controlled association method is used first to reduce the total number of pairs the expert is asked to consider to only those that are most related.
e. Card sorting:
   1. Put all domain-critical concepts on separate index cards.
   2. Ask the SME to sort cards into piles according to their semantic relatedness. A single concept may be placed in multiple piles.
   3. Ask if any of the resulting piles are related to one another
   4. For all concepts put in the same first-order pile, these concepts will be linked with the strongest weight (unless #6 below is true).
   5. All concepts that belong to piles that are related to one another (second-order relationships) with the next strongest weight.
   6. If there are any concepts that are placed in multiple first-order piles together (e.g., concepts A and B both appear in piles 1 and 2) they should get the strongest weight with the other links determined from the first-order piles discussed in step 4 above getting the next strongest weight.

Once the semantic network has been built by one of the above methods, have the SME examine it and modify as necessary.

The previous sections described the knowledge elicitation strategies used to provide data to populate the computational model. This section, along with the next, describes the way this data is represented in the model, and the way the required functionality of the model is created. It is assumed that the following information, obtained using the methods described in the previous sections, or comparable methods, is available to populate a model:

1) Critical concepts for application/domain (i.e., cues, with intermediate and high-level concepts)
2) Associative strength for each potential concept pair
3) Critical situations for application/domain (i.e., actions)
4) Relatedness of each concept-situation pair (i.e., bottom-up value of cues in situation recognition)

The model consists of three primary modules that handle semantic knowledge, pattern recognition and action generation. The semantic module incorporates a semantic network with nodes representing each critical concept. In the pattern recognition module, there are mechanisms for evaluating the evidence provided by cues favoring or disfavoring each situation, and there may be mechanisms for assessment of validity of current situation, determination of situation when current situation is not valid, evaluation of unexpected cues and implementation of top-down activation. Action Generation contains scripted actions corresponding to each situation. As noted earlier, this organization is actually slightly different from the conceptual diagram of the architecture presented at the beginning of the paper.

Semantic Module

The semantic module 20 is represented in FIG. 3 as created with MicroSaint, a general purpose, discrete-event simulation software tool that is widely used by psychology researchers, and which is available from Micro Analysis & Design, Boulder Colo. Module 20 features a semantic network with nodes 22 for each concept. The domain for which this embodiment was designed was how a two person SWAT team would enter and sweep a room to neutralize a hostile target.

Nodes 26 and 27, the Router Timer and Reset Timer respectively, accomplish timing functions for the semantic module, sending periodic pulses at a frequency of 10-13 Hz (a bandwidth of brain wave frequencies) to synchronize the nodes that are not actuated and to provide a starting frequency for the actuated nodes. These two timer nodes represent a continuous loop activated on launching the simulation. Router Timer node 26 provides for the duration of each cycle of the semantic module. This node has a mean time expressed as Sem_Arousal. This value represents the duration associated with pulses of a pacemaker and by adjusting this value, the general level of arousal may be modified. The value assigned to this timing variable should be in the range of 76.9 to 100 ms, consistent with cycles in the 10-13 Hz alpha bandwidth. For general purposes, a value of 100 ms is recommended.

The Reset Timer node 27 provides the trigger for each cycle of the semantic module. Following activation of the Router Timer node, the Reset Timer is activated. This results in the variable, Sem_Timer, being set to 1. This event serves as the trigger for Primary Router node 28 to send out a pulse of activation to the network. Without exacting a time duration, activation loops back to the Router Timer 26 and on commencement of the next duration of the timer, the trigger is reset to 0.

The Primary Router 28 is activated at the beginning of the simulation, through presentation of simulated perceptual data once triggered by the semantic timing mechanism (i.e., the router timer and reset mechanism). Consequently, each simulation run begins-with a period of inactivity corresponding to the first cycle of the semantic timer (approximately 100 ms). Once activated, the Primary Router 28 distributes activation to each node 22 in the semantic network that is currently inactive (i.e., each node that is not oscillating). Afterward, the router 28 awaits the next trigger from the semantic timing mechanism.

As stated above, each node 22 oscillates at low amplitude and in synchronization with the system oscillator of nodes 26, 27 when the concept associated with that node is not actuated. For the purposes of understanding the invention, the node is considered to be not oscillating in this status. Upon activation, the node oscillates independently of the system oscillator.

Activities of the Primary Router 28 begin with the following expression:

Exp. 1: If Act_ConceptA==0 & LA_ConceptA>0 then LA_ConceptA:=0; where
  a) Act_ConceptA is a binary variable that indicates whether a concept node is currently oscillating (where 0 means the node is not oscillating and 1 means the node is oscillating), and b) LA_ConceptA is a continuous variable that indicates the current level of activation of a node 22. If the value for this variable exceeds a pre-set threshold, the node will begin to oscillate and the variable Act_ConceptA will be set to 1. The value of this variable is determined by perceptual activation, top-down activation, and spreading activation from other nodes.

Each node 22 in the semantic network represents an independent pulse oscillator that generates output pulses as long as activation energy is applied to it. When the activation distributed to a concept by the Primary Router (represented by the value of LA_Concept A) surpasses a pre-set threshold, a node such as node 22-*a* associated with the concept begins to oscillate (i.e., Act-ConceptA is set to 1). Depending on the level of activation and activation decay factors (to be discussed later), the node 22-*a* will continue to oscillate for some duration. Nodes are activated for a duration varying in accordance with the values of Sem_Arousal and LA Concept for the node. Once a node no longer has enough momentum to continue to oscillate, the value of Act-ConceptA is reset to 0.

The condition of interest in Expression 1 is one in which there is a level of activation greater than 0, yet the node (for example, node 22-*d*) is currently not oscillating (LA ConceptA>0 and Act_ConceptA=0). In this case, the level of activation is set to 0 because the level of activation did not exceed the threshold required for the node 22-*d* to begin oscillating. This expression assures that subsequent operations by the Primary Router 28 concerned with establishing the level of activation for each eligible node begin with activation reset to 0, for each eligible node. The implication of this action is that there is no carry-over of activation from one cycle of the network to the next; i.e., level of activation is not cumulative.

Level of activation for a given concept node (LA_ConceptA) is determined by three things: activation from perceptual stimuli, top-down activation, and spreading activation from other nodes. If the level of momentum of a particular node reaches the pre-set threshold, it will begin to oscillate, and the Act-ConceptA variable will have a value of 1. Otherwise, if level of activation does not exceed the threshold, Act_ConceptA will remain at 0 and the node will not oscillate.

Once the Primary Router 28 has determined which nodes are eligible for activation (i.e., those nodes for which Act_ConceptA=0 and LA_ConceptA=0), the Primary Router 28 establishes the level of activation to be distributed to those nodes in the semantic network. This is accomplished by the expression:

Exp. 2: If Act_ConceptA==0 & LA_ConceptA<=0 then LA_ConceptA:=random( )* Adj_ConceptA, where
  a) Act_ConceptA indicates whether a node is currently oscillating;
  b) LA_ConceptA indicates the level of activation for a given concept node
  c) randomo is a random amount of activation assigned to a concept node by the Primary Router 28. This is most often a very small number and is alone rarely sufficient to cause a node to begin oscillating, and
  d) Adj_ConceptA is an adjustment factor for a given node. This factor is calculated by multiplying a model-wide adjustment constant (equal to 1 in this case) by the amount of activation coming to the node from perceptual, top-down and spreading activation.

Activation only needs to be determined for nodes that are not currently oscillating. Expression 2 first establishes this condition by asserting that Act_Concept must be 0 and the current level of activation must be less than or equal to 0. If this condition is met, the level of activation to be assigned to the concept is determined. This determination involves first identifying a random number between 0 and 1 and then multiplying this number by the adjustment factor for each node (Adj_ConceptA). This variable represents an adjustment to a node's level of activation. It begins with a default value of 1, but various events that occur during a simulation run may lead to either increases or decreases to this value (e.g., spreading activation, top-down activation, etc.)

The routing condition for the Primary Router 28 has potential to distribute activation to each node 22 during each cycle of the semantic module. Those nodes receiving activation are determined by the expression:

Exp. 3: If Act_ConceptA=0 & LA_ConceptA>=Act_Thresh then 1 else 0; where
  a) Act_ConceptA indicates whether a node is currently oscillating
  b) LA_ConceptA indicates the level of activation for a given concept node, and
  c) Act Thresh is the threshold that the level of activation must equal or surpass in order for the node to begin oscillating.

Here, the condition is stated that in order to begin to oscillate (as opposed to continuing to oscillate), a node must be inactive and the level of activation established by the Primary Router 28 in previous operation must exceed the pre-set threshold (Act_Thresh). This threshold establishes a level of activation that must be exceeded before a node is allowed to begin to oscillate. A default value of 0.999 may be used to allow each concept to be randomly activated sufficiently for oscillations on average once in ever one thousand cycles of the semantic module. This introduces the potential for random thoughts to intrude on cognitive processes.

The duration of each activation cycle is calculated using the expression:

Exp 4: Duration=Sem_Arousal−(LAI_ConceptX/100); where
  a) Duration is the rate at which a given node will oscillate.
  b) Sem_Arousal is the baseline duration of 100 ms in between pulses associated with the pacemaker.
  c) LA_ConceptA is the current level of activation for a given concept.

This equation states that as the level of activation for a given node increases, the rate at which it oscillates also increases. The intent is for the frequency of oscillation cycles to be slightly greater than that of the Primary Router, which serves as a baseline for the overall semantic module. Furthermore, this frequency should be proportionate to the level of activation for the concept such that cycle duration is shortest when the level of activation is at its greatest.

To produce this effect, Expression 4 begins with the baseline duration defined through the variable Sem_Arousal. This duration is reduced by subtracting the level of activation for a given node divided by one hundred. Thus, if the baseline duration (Sem_Arousal) is 100 ms, and a concept receives a level of activation of 1.5, the resulting duration would be 85 ms. Future enhancements to the model may include a generalized adjustment to this expression that more precisely accounts for the relationship between the frequency and amplitude of activation for neural assemblies.

Activation of a concept node begins by setting the value of the variable Act_ConceptA to 1, indicating that the concept node is activated. Next, for each concept for which there exists an associative relationship, the adjustment factor for that concept, Adj-ConceptA, is modified to provide for the effects of spreading activation between related nodes in the network. As stated above, the variable Adj_ConceptA serves to adjust the level of activation assigned concept nodes by the Primary Router. Expression 5 produces the modification to a single related node; there must be an equation for each associative relationship in the network.

Exp. 5: Adj_ConceptB=Adj ConceptB+[(1/N_ConceptA) *LA_ConceptA*SpFunc* Associative Strength]; where
  a) Adj_ConceptB is the amount of activation Concept B will receive as a result of receiving spreading activation from the originating Concept A.
  b) N_ConceptA specifies the number of concepts in the network that are related to the originating node, concept A.
  c) LA_ConceptA is the level of activation of the originating node, concept A.
  d) SpFunc is a constant that determines the overall amount of spreading activation that can take place. The larger this value, the more spreading activation in the model.
  e) Associative Strength indicates the strength of the relationship between the originating concept (A in this case) and the receiving concept (B in this case).

The adjustment is additive starting with the baseline adjustment for Concept B (Adj_ConceptB), then increasing that variable by a value proportionate to the level of activation for node A and strength of association between the two concepts, A and B. In determining the value of the adjustment, first there is consideration of the number of concepts with associative relationships to node A that will receive spreading activation due to activation of that concept. In this model, the activation available for spreading activation is somewhat finite and must be divided between recipient concepts. The term N_ConceptA indicates the number of concepts that receive spreading activation as a result of activation of Concept A. As it is now specified, activation is proportionately divided among the recipient nodes according to the strength of their association to the originating node. So, if Concept B is more strongly associated to A than Concept C (as determined by the difference in the values of Associative Strength for Concepts B and C), Concept B will receive a larger portion of the total activation coming from A. Further enhancement to the model may include development of a function that differentially distributes activation. Additionally, an alternative approach will be required for models of knowledge derived through techniques such as Latent Semantic Analysis whereby the strength of association between concept pairs is continuous, as opposed to the discrete representation in the current model. Furthermore, whereas the current technology bases the influence of activation of one concept on increases of activation of associated concepts; alternative approaches may be based on release of inhibition on those concepts.

The second term in Expression 5 (LA_ConceptA) considers the level of activation for the originating concept. The activation available for spreading activation should be proportionate to this level of activation such that as concept activation increases, there is more activation available to spread to other concepts.

The term SpFunc offers a generalized factor for adjusting the overall level of spreading activation within the model. A default value of 0.25 is recommended for this function, although adjustments may be needed to attain the desired behavior with the model. Finally, a value is entered that reflects the strength of association for the concept pair. In the current model, discrete values between 1 and 4 have been utilized, however future models may incorporate a higher level of fidelity or different numeric scales (e.g., a scale from 0 to 1 with latent semantic analysis). These values are the weights of the links between nodes in the associative network.

As each cycle of activation for a concept node comes to completion, three events occur. First, the variable Act_ConceptA is reset to 0, indicating that the concept is no longer activated, or is between cycles. Second, adjustments due to spreading activation are reversed using: Exp. 6: Adj ConceptB=Adj_ConceptB−[(1/N_ConceptA) *LA_ConceptA*SpFunc* Associative Strength]. This expression is identical to Expression 5 except that there is a reduction, as opposed to addition, to the adjustment factor for Concept B. Third, there may be a reduction to the level of activation that is due to decay (or damping).

This reduction is enacted through Exp. 7: LA_ConceptA=LA_ConceptA−[Decay−(Adj_ConceptA/Adj_Factor)], where
  a) LA_ConceptA indicates the level of activation for a given concept node.
  b) Decay is the constant decay function which equals 0.05 with many models.
  c) Adj_ConceptA is the adjustment to the level of activation of a given concept node that is determined by perceptual, top-down, and spreading activation.
  d) Adj_Factor is a constant in the model that appropriately scales the value of Adj_ConceptA.

Here, there is an adjustment based on the level of activation during the previous cycle. For each cycle without the influence of adjustments, there is a gradual reduction in the level of activation for the concept node with the eventual outcome that the level of activation is no longer sufficient to sustain oscillations (i.e., it no longer exceeds the activation threshold). Because the adjustment factor is determined in part by top-down activation and spreading activation from other nodes as well as additional perceptual activation, and because that adjustment value is subtracted from the Decay constant, it is possible for decay to be reduced or totally canceled. However, it is necessary to scale the adjustment factor using the term Adj_Factor, which may be assigned a default value of 100. This scaling prevents unchecked increases in level of activation for a given node.

Finally, following each cycle of a concept node, two events may follow. If the level of activation exceeds a threshold value (currently, a value of 1 is used), oscillations are sustained and the node is activated for another cycle. However, if the level of activation has diminished to a value less than the threshold, oscillations are terminated and the node becomes a candidate for activation with the next cycle of the Primary Router.

To summarize the steps required to create semantic module 10:
  a) Copy Timer mechanism and Primary Router.
  b) Create node representing each concept.
  c) Create links between Primary Router and each concept.
  d) Create terminal node and links between each concept and terminal node.
  e) Enter Expression 1 for each concept.
  f) Enter Expression 2 for each concept.
  g) Enter routing condition for each concept (i.e., Expression 3).
  h) Enter Expression 4 for each concept.
  i) Specify number of concepts receiving spreading activation for each concept.
  j) Enter spreading activation for each applicable concept pair.
  k) Enter routing conditions for each concept node.

Situation Recognition

Figure 4:
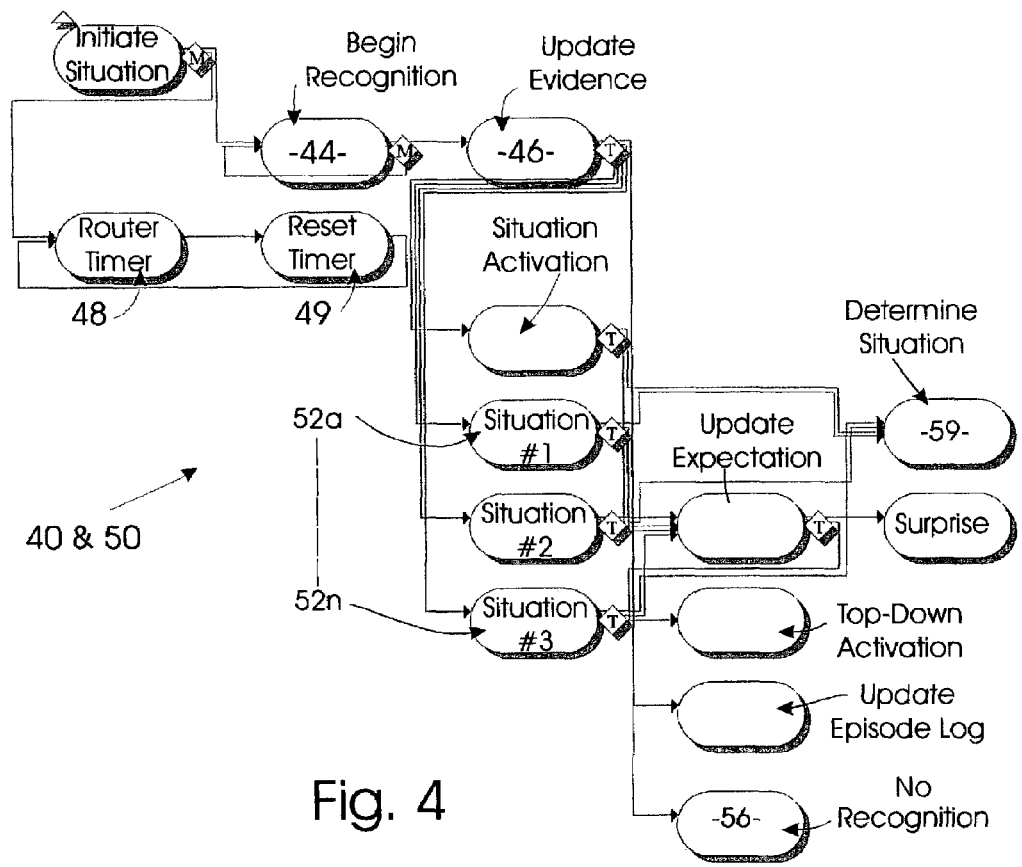
FIG. 4 shows a computational representation of situations in an embodiment of FIG. 1.

The situation recognition module 40 of FIG. 4 serves multiple functions. First, it acts as the repository of situations derived from the experts. Second, it acts as the pattern recognition function (block 80 of FIG. 1) that allows the model to recognize different situations based on the pattern of activation in the semantic network.

In any given situation, there are alternative possible interpretations of ongoing events determined in part by the cues that the person or model is experiencing in the environment. Paired with these interpretations are actions that are appropriate—recognition of a given situation serves as a basis for activating the heuristic processes that generate actions appropriate for that situation. The pattern recognition function in this module observes the activation of concept nodes in the semantic network and uses this information to identify corresponding situations. The underlying mechanism is one whereby there is a continual updating of evidence associated with alternative situations (as determined by the pattern of activation across the semantic network). Recognition occurs when the evidence for a given situation exceeds a threshold value and is greater than the evidence for each of the other possible situations.

Once a situation is recognized, there are expectations that are dictated by that situation—assumptions are made about what is and is not likely to happen as the situation unfolds. Comparator 90 may respond if there are any active cues in the semantic network which violate the expectations associated with the situation. And related concepts are "primed," or are made more sensitive to the presence of corresponding stimuli in the environment. Therefore, in the model, situation recognition leads to top-down activation of associated concepts in the semantic network.

Mapping of cues to situations is coded into the Beginning Effects section of the Update Evidence node 46 of FIG. 4. In this portion of the model, evidence for each node is equal to the sum of the level of activation for the node multiplied by its activation (whether it is on or off) multiplied by the relative importance assigned the cue for that situation.

The pattern recognition module utilizes a Timing mechanism identical to that described earlier for the semantic module of FIG. 3, with the exception that the mean time for each cycle is expressed by the variable, PR_Arousal, and the router 48 is reset at the end of each cycle by the variable, PR_Timer. The former variable preferably has a cycle duration between 144 and 250 ms, consistent with oscillations in the $\theta$ bandwidth (4-7 Hz).

The recognition process of FIG. 4 begins when the Begin Recognition node 44 activates with each cycle of the timer 48. Following its activation, subsequent nodes provide for situation recognition. There is top-down activation of the corresponding semantic concepts once the situation is recognized. This process unfolds instantaneously at the beginning of each cycle of the pattern recognition mechanism, with none of the nodes in the process incurring clock time. However, given no psychological rationale for the accumulation of top-down recognition across cycles, the Begin Recognition node 44 resets the top-down activation that was enacted during the previous cycle. This is accomplished through Exp. 8: If Cur_Sit=N then Adj_ConceptA=Adj_ConceptA−[1/n)*Ev_ConceptB* TDown_Func*Top-Down Associativity], where a) Cur_Sit=N is the unique numeric label assigned to designate each situation b) Adj_ConceptA is the adjustment factor for a given concept—this is the same variable as is used in the Semantic Network c) Ev_SituationB makes top-down activation proportionate to the level of evidence for a situation d) n is the number of concepts receiving top-down activation from a given situation.

e) TDown_Func is the constant that defines the amount of top-down activation throughout the model. It is analogous to the SpFunc term that determines the amount of spreading activation in the model. After testing several candidate values, a default value of 0.1 seemed reasonable for this function.

f) Top-Down Associativity is analogous to the Associative Strength term for the Semantic module and indicates how related each concept is to the current situation. Currently, integer values of 1-4 have been used, however other arrangements may be employed in subsequent versions of the model. These values are ideally determined by subject matter experts.

The equations dictating top-down activation are very similar to the equations determining spreading activation in the semantic module. Each situation is assigned a numerical label identified by the variable: Cur_Sit. Thus, the conditional statement identifies which situation is currently active. Each situation will have a set of statements of this nature to reverse the associated top-down activation.

There will only be a subset of concepts receiving top-down activation due to any given situation. A separate version of Expression 8 is required for each concept that receives top-down activation, which occurs through a modification to the adjustment factor. To reverse top-down activation, the associated adjustment is subtracted from the adjustment factor, rather than added, for each applicable concept.

When top-down activation is enacted, the amount of activation is proportionately distributed across eligible concepts. The term 1/n proportions the activation relative to the number of concepts, with n representing the number of concepts receiving top-down activation.

The activation generated for each situation by cues during the pattern recognition processes is represented by the variable, Ev_SituationA.

Evidence for a situation is determined by calculating the sum of the levels of activation for each of the concept nodes relevant to that situation. Recall that level of activation is made up of activation from perceptual stimuli, top-down activation, and spreading activation. This term operates in Expression 8 to provide a level of top-down activation that is proportionate to the activation associated with the situation. As currently modeled, only the current situation induces top-down activation, and only one situation can be recognized at a time—there cannot be multiple candidate situations active at once.

Unlike node levels of activation in the semantic network, some portion of the activation amassed for each situation is assumed to persist from one cycle to the next, even if the level of activation for that situation has not surpassed the threshold required for recognition. However, the model currently employs a substantial decay of activation. A second operation that occurs at the Begin Recognition node adjusts the level of activation for each situation in accordance with this decay, through the expression:

Exp. 9: if Ev_Situation A>0 then Ev_Situation A=Ev_Decay*Ev_Situation A else Ev_SituationA=0; where a) Ev_SituationA is the evidence calculated for a given situation as described above and is a continuous variable; and b) Ev_Decay is the constant set for decay of situation activation levels across the Situation Recognition module. It is analogous to the Decay term used in the semantic network.

In this expression, if the activation of the situation during the previous cycle is greater than 0, the decay term, Ev_Decay, is applied to reduce the level of activation. A default value of 0.1 has proven reasonable for the decay term. Otherwise, the level of activation is set to 0, which corrects for cycles in which negative relatedness produces an inhibitory effect and a negative value for activation. A separate version of Expression 9 should be incorporated for each situation.

The second node 46 in the pattern recognition process, Update Evidence, begins by calculating the level of activation associated with each situation through Exp 10: Ev_SituationA=Ev_SituationA+ (A_Ev_ConceptA*Ev_Factor) [(LA_ConceptA*Act_ConceptA)+(LA_ConceptB* Act_ConceptB)−(LA_ConceptC*Act_ConceptC); where a) Ev_SituationA is the evidence calculated for a situation as described above b) A_Ev_ConceptA is the bias that is present once an action has been undertaken. This bias simply states that once a situation has been recognized and a corresponding action has been taken, the model is more likely to persist in that course of action c) Ev_Factor is part of the action bias and is a constant d) LA_ConceptA is the level of activation for a given concept node.

The expression begins with the activation level for a situation that is left over from the previous cycle, as represented by the variable Ev_SituationA. There is an adjustment to evidence if actions associated with the situation are in progress. This creates the condition that once an action has commenced, there is a tendency to persist with the interpretation of events that prompted the action. The variable A_Ev_ConceptA provides the adjustment and is specified through the action execution process. Ev_Factor is a function that allows general adjustments to the bias due to action execution. Evidence for every situation is updated once every cycle, with the duration in the theta bandwidth.

Next, for each concept for which there is positive or negative relatedness to the situation, the level of activation is either incremented or decremented, respectively. Increments and decrements are based on the level of activation for the concept. However, since the variable Act_ConceptA will have a 0 value if a concept is not activated at a level sufficient to sustain oscillations, application of this term leads to no change in the activation for the situation where concept nodes are not in an oscillatory state. Otherwise, the variable Act_ConceptA has no effect since it will have a value of 1 when concept nodes are in an oscillatory state.

Next, based on updated evidence, it is determined whether a condition exists wherein there is sufficient evidence for recognition of any of the situations. A pre-set value is assigned to the variable Ev_Thresh, which represents a threshold such that if the evidence for none of the situations exceeds this threshold, there is no situation recognition. A default value of 5 has been used for this variable.

The following expression determines if there is no recognition:

Exp. 11: if Ev_SituationA<Ev_Thresh & Ev_SituationB<Ev_Thresh then New_Sit=100.

The variable New_Sit represents the current state of situation recognition. When there is no recognition, a value of 100 is assigned. Further development of the model will use this condition to prompt levels 2 and 3 recognition-primed decision processes when no recognition occurs in order to enable the model to employ strategies like mental simulation and story-building to enhance recognition.

Within the pattern recognition module 50, nodes 52-a to 52-n exist for each situation. The variable Cur_Sit indicates, through a numeric value, the situation recognized during the previous cycle. Once evidence has been updated, the subsequent routing condition directs activation to the node representing the situation indicated by Cur_Sit. The exception to this is the case wherein no situation exceeds the activation threshold, indicating a situation was not recognized on the previous cycle, and activation is routed to a No Recognition node 56.

The intent is that once a situation has been recognized, there should be a bias in favor of continued recognition of that situation during subsequent cycles. In the each of nodes representing situations, the expression below determines if the current situation remains valid over subsequent cycles:

Exp. 12: if Ev_Situation A>Ev_Thresh & Ev_Situation A+Sit_Bias>Ev_SitationB & Ev_SituationA+ Sit_Bias>Ev_Situation C then New_Sit=0 else New_Sit=1, where:

a) Ev_SituationA is the calculated evidence in favor of situation A as described above.

b) Ev_Thresh is the evidence threshold required for situation recognition.

c) Sit Bias is the constant term that allows for a bias of continued recognition of an already-recognized situation.

d) Ev_SituationB, Ev_SituationC, etc. are calculated evidences for other situations in the situation recognition network.

e) New_Sit is the variable indicating whether a new situation has been recognized or not.

Expression 12 first verifies that the activation for the situation exceeds the threshold for situation recognition. Next, a bias term is added to the activation for the situation and the sum is compared to the activation for each of the other situations. If no other situation has greater activation, the variable New_Sit is assigned a value of 0 indicating that the current situation remains valid. However, if another situation does have greater activation, New_Sit receives a value of 1. A default value of 2 may be assigned to the variable Sit_Bias.

After determining which situation is recognized, a routing condition sends the simulation in one of two directions. If New_Sit is 1, then the next node is Determine Situation where the value of Cur_Sit is updated. However, if New_Sit equals 0, then the comparator operates, prior to enacting top-down activation. This latter possibility is discussed in a later section.

The Determine Situation node 59 compares the evidence for each situation to establish the situation receiving the most activation. This occurs through the following expression, with versions for each situation:

Exp. 13: if Ev_SituationA>Ev_SituationB & Ev_SituationA>Ev_SituationB then Cur_Sit1:=SituationA.

Here, the activation for each situation is compared to that for each of the other situations. If no situation has a greater level of activation, the variable Cur Sit is assigned the numeric value corresponding to the situation.

If the current situation remains valid, the variable New_Sit equals 0 and the next step is the Comparator, where there is a determination if there are any unexpected concepts activated.

When activated, the Comparator elicits a surprise response accompanied by an orienting response when cues are activated that are unexpected given the current situation. The following expression determines if the Comparator is activated:

Exp. 14: if Cur_Sit−Situation A then Unexpect= (LA_ConceptA*Act_ConceptA)+ (LA_ConceptB*Act_ConceptB).

This expression first determines the current situation based on the variable Cur Sit. For each situation, a collection of concepts is identified that would be unexpected or sufficient to elicit surprise and/or an orienting response. The variable Unexpect represents the level of unexpectedness for the situation. Its value is derived by summing the level of activation for each of the concepts identified as unexpected. By including the term Act_ConceptA, only concepts for which activation is sufficient to sustain oscillation are allowed to influence unexpectedness.

If the resulting level of unexpectedness, reflected by the value of the variable Unexpect, exceeds the threshold represented by the variable UnThresh, the Comparator responds. Otherwise, the simulation progresses to the next step. A default value of 5 has been used for the variable UnThresh.

The assignment of top-down activation repeats the process described in Expression 8 for reversing top-down activation.

Exp. 15: if Cur_Sit=SituationA then Adj_ConceptA=Adj_ConceptA+[(1/n)* Ev_SituationA*TDown_Func*2].

As shown in Expression 15, there is first a determination of the current situation. Next, the adjustment for each associated concept is incremented, proportionate to the level of activation for the situation and other factors described previously.

In summary, the follow steps are used to create the situation recognition module of FIG. 4:
a) Copy Timer mechanism
b) Enter statements to update evidence for each situation
c) Enter situations in Expression 11
d) Create nodes for each situation
e) Enter Expression 12 for each situation to determine if current situation remains valid
f) Enter Expression 13 for each situation to compare situations for recognition
g) Enter expressions for determining unexpectedness for each situation
h) Enter statements to enact top-down activation for each situation
i) Enter statements to reverse top-down activation for each situation in Begin Recognition node 44
j) Enter statements for activation decay for each situation in the Begin Recognition node.

Action Generation

Figure 5:
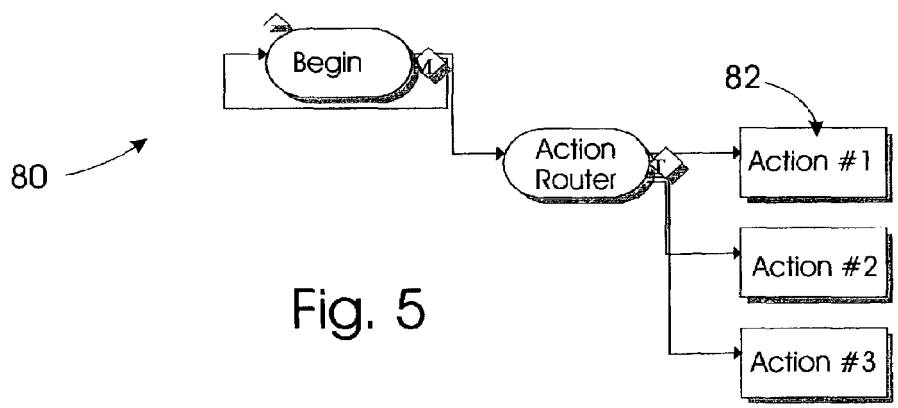
FIG. 5 shows a computational representation of the action generator module of FIG. 1.

Action generation 80, FIG. 5, dictates what the simulated agent actually does in response to a recognized situation. This portion of the model also contains a bias in that once an action is undertaken, the model remains "on task" such that it won't abandon that action unless something radical happens that totally alters the model's perception of what is going on.

The generation of actions occurs through a relatively simple scripting process. In the current model, unless an action has been suspended, a new action cannot be initiated until the previous action has been completed. This condition is established at the beginning node through the following expression:

Exp. 16: if (New_Act=a & Cur_Sit=m &In Progress=0)| (New_Act=b & Cur_Sit1=n & In Progress=0) . . . then 1 else 0; where:
a) New_Act is the variable identifying each possible action
b) Cur_Sit is the variable that defines each possible situation
c) In_Progress tells the model whether an action is currently in progress or not The variable New_Act has a unique value associated with each action and is assigned that value when the action is initiated. The variable In_Progress indicates if an action is currently in the midst of execution. Consequently, through Expression 16, if the previous action has been initiated and reached completion, the action associated with the current situation may be executed.

To model the potential for errors of omission or commission, it is only necessary to replace Expression 16 with Exp. 17: if In_Progress=0 then 1 else 0. With this expression, the simulation only assures that the previous action has completed before initiating the next action. To remove the condition that an action must be completed, either Expression 16 or 17 may be removed, however it is recommended that the MicroSaint Suspend function be used instead as this provides a somewhat more stable execution.

Once an action is initiated, if it is desired that the model execute a sequential series of actions, an expression appears to adjust New_Act to the value corresponding to the next action. This occurs through Exp. 18: if New_Act=a & Cur_Sit=m then New_Act=b.

Next, actions are routed based on the identity of the current situation. This involves the routing condition, Exp. 19: if Cur_Sit=a then 1 else 0, where there is a separate statement for each action (i.e., Cur Sit number).

Figure 6:
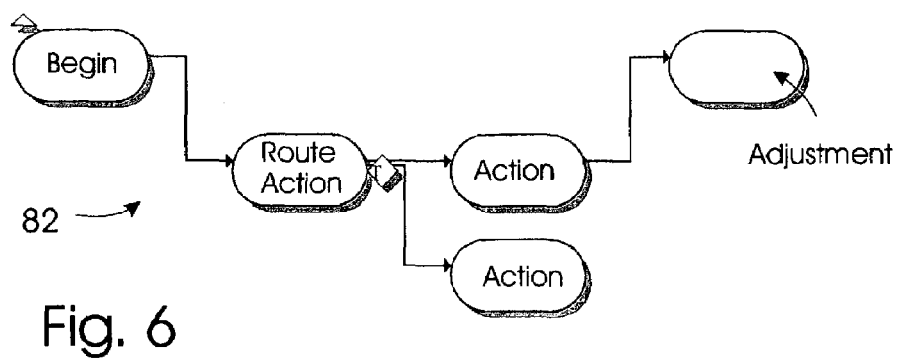
FIG. 6. shows a detail of FIG. 5.

Actions are specified by a network containing nodes for individual steps, depending on the level of detail at which the task sequence is specified. FIG. 6 shows the network for a typical action. This network uses a routing condition to accommodate the potential that the action may be executed from different locations. The simulation does not incorporate mechanisms to flexibly determine action execution parameters, but selects from a collection of predefined execution parameters. The selection is based on the current location of the entity. For instance, Exp. 20: if x=m & y=n then 1 else 0; states that a certain action should be executed if the location of a certain entity on the x dimension equals m and the on the y dimension equals n. The execution node contains the instructions for execution of the selected action. These instructions include a mean time with an associated standard deviation and distribution of time values. Once the action has commenced, the variable InProgress is assigned a value of 1 to indicate that a task is underway. A second variable, Start, is also assigned a value of 1. This variable is utilized with adjustments that occur once action execution has completed.

The simulation provides for a bias in which the situation that spawned a given action is favored as the ongoing interpretation of events for the duration of action execution. This bias is effected through the following Exp. 21: A_Ev_SituationA=A_Ev_SituationA+1, where the variable A_Ev_SituationA represents an adjustment that is applied to the evidence for the situation during the pattern recognition process.

Three events occur at the conclusion of an action. First, completion of an action may create cues that will factor into subsequent situation recognition. The activation of such a cue occurs through modification of the adjustment applied to semantic nodes representing the cue. This is accomplished through Exp. 22: Adj_ConceptA=Adj_ConceptA+1. Next, the bias to situation recognition introduced through Expression 22 must be reversed. If the execution of the action involved movement, the values of the x and y parameters must be updated. Finally, the InProgress variable must be returned to 0 to indicate that the task is no longer in progress.

Following task execution, there is an adjustment node. The purpose for this node is to diminish the activation of cues associated with action execution. A mean time is assigned that reflects the duration of such cues. Once this time has expired, the adjustment introduced through Expression 22 is reversed and the variable Start is returned to 0.

Cognitive Collective

In the Knowledge Elicitation section above, concepts and situations were derived from a SME. However, people perceive and act on information in different ways. During the development of this invention, the inventors determined that 'averaging' the ideas of SMEs did not provide satisfactory results. The Cognitive Collective overcomes that problem.

The Collective is intended to aid in the collection and dissemination of that evidence across experts. If the domain involves reaching a conclusion that is not clear cut, such as whether or not an insider is a security threat to an organizations, different experts may view cues relating to suspicious behavior differently. Individually, one expert may not recognize a threat from the situations he perceives. However, if these experts share their different viewpoints, they may agree that a given person was acting suspiciously.

Several alternative algorithms have been evaluated for computationally instantiating the Collective.

Summative versions of the Collective sum the total amount of evidence from activated concepts nodes in each of the individual experts' networks and compare that grand sum to a threshold. These two summation versions of the Collective will not function unless at least one of the individual models fails to recognize a situation.

One option for the Collective is to simply sum the evidence for and against a decision across models and, if that sum exceeds a threshold, the group model recognizes a situation.

The equation for this alternative is simply a sum of the sums of the levels of activation for each of the nodes in each of four models' semantic networks, and can be represented as:

Exp. 23: TotalEv:=$\Sigma\Sigma$(LA ConX*Act_ConX), where:
a) LA_ConX is the level of activation for a given concept
b) Act_ConX is the activation status of concept X. This is a binary variable where a value of 0 means the node is not oscillating and a value of 1 means the node is oscillating.

Multiplying the level of activation of each node by the Act variable ensures that only concepts recognized by each expert are considered by the Collective.

A second option for Cognitive Collective, weighted sum of total evidence, takes into account the relative importance of each concept to the ability for each SME to make the determination. It may be Exp 24: TotalEv:=$\Sigma\Sigma$ (LA_ConX*Act_ConX*ImpWt_ConX), where:
a) LA_ConX is the level of activation for a given concept
b) Act_ConX is the activation status of concept X. This is a binary variable where a value of 0 means the node is not oscillating and a value of 1 means the node is oscillating.
c) ImpWt_ConX is the score each expert gave to that concept as "sufficient in combination with other concepts to cause suspicion."

Each expert rated each concept with regard to it being sufficient by itself to cause suspicion and sufficient in conjunction with other concepts to cause suspicion. The second score is used because, if an individual model has not recognized a situation, then multiple models will contribute to the decision. It is presumed that more than one model will have recognized cues, so using the score expressing that a cue is "sufficient to cause suspicion in conjunction with other cues" is the more appropriate score.

After examining the data from the individual experts, it has become apparent that there may be common themes into which their concepts fit. The notion behind Cross-Model Spreading Activation is to capitalize on the priming effects that these themes could have on the experts during a group decision-making session. That is, if Expert 1 recognized a concept as belonging to a theme, it would then exert some influence over the adjustment factors of concepts in the other three expert models that also belong to this theme, effectively priming those concepts for rapid recognition in the event that their corresponding stimuli are in the stimulus set.

Examples of a series of initiating equations for a collective of four experts are shown below: Exp. 25a: Adj2_ConceptB=Adj2_Concept+ LA1_ConceptA*ThemeFunc*ThemeStr]; Exp. 25b: Adj3_ConceptC=Adj3_ConceptC+ [LA1_ConceptA*ThemeFunc*ThemeStr]; Exp. 25c: Adj4_ConceptD=Adj4_ConceptD+ [LA1_ConceptA*ThemeFunc*ThemeStr]; where
a) Adj2_ConceptB, Adj3_ConceptC, and Adj4_ConceptD are the receiving nodes in the other three experts' networks (the number immediately following the variable name, e.g., Adj2, stands for the expert to which it refers),
b) LA1_ConceptA is the originating node, which belongs to expert 1,
c) ThemeFunc is a constant that determines the rate of spreading activation, and
d) ThemeStr is the relative importance that the SME assigned to that particular theme.

There are multiple equations above in order to illustrate the point that there are multiple sets of equations in each node—one set for the thematically related concepts in each of the other three expert networks. There must be one of these equations for each receiving concept in the other models. Also, there may be receiving equations for only Expert 1 in an Expert 2 node, which indicates that the other models do not have concepts belonging to that theme.

The real-world analogue to cross-model thematic spreading activation is that an expert recognizes a concept that belongs to a particular theme and he mentions it to the others in the group. Because other members of the group have concepts that are thematically similar. The others are more likely to think of instances they witnessed that fall into the same theme (i.e., thematic spreading activation). However, if the expert does not recognize a concept (that is, if the node does not begin to oscillate), he cannot mention it to other group members (that is, cross-model spreading activation cannot take place).

The Hybrid Summation/Cross-Model Thematic Collective evaluates both the cross-model thematic spreading activation equations and the summation equations during each cycle. It is expected that the cross-model spreading activation equations will have a significant effect on the Adj values for individual concepts, which will in turn increase the chances that those concepts will be recognized in the first place and will have an impact on the latency with which the Collective recognizes a suspicious situation. This occurs because the Adj value for a given concept influences its level of activation (LA) and the summative models of the Collective combine the recognized concepts' LA values.

In any version of the Cognitive Collective, it is possible that despite the presence of a given stimulus in the stimulus set, a SME may not recognize that concept. Because there are identical concepts across networks, it would be useful for experts to be able to remind one another of the presence of those concepts in the stimulus set. All versions may include a Remind function, Exps 26a and 26b:

if Act1_ConA==1 & Act3_ConY==0 then LA3_Con Y:=LA3_ConY+Remind;
if Act1_ConA==1 & Act3_ConY==0 then Act3_Con Y:=1;

This set of equations defines the identical concepts across experts. The Remind function in the corresponding nodes is sufficiently large that if one expert notices a particular concept he reminds the other experts of this. If, for some reason, the other experts have not noticed this concept (i.e., the concept nodes are not oscillating, Act_ConX==0) the remind function is designed to start the node oscillating (with the second equation) and to make that node's level of activation sufficiently large to keep the node oscillating for a period of time. Note that the function operates on the connected node's level of activation rather than the adjustment factor. This is because normally, the node can only begin oscillating if the stimulus is present and this would be the case if the remind function operated on the adjustment factor. These equations allow a node to begin oscillating even if the required stimulus isn't present in the stimulus set or if the node does not oscillate because of the probabilistic term in the LA equation. Note also that the Remind function is not executed if the receiving node (in this case, ConA) is oscillating. This ensures that the additional activation provided by the Remind function only occurs if the receiving expert didn't respond to the concept. There is a remind equation for each pair of identical concept across networks.

Although the foregoing embodiment was implemented in MicroSaint, as exemplified by the expressions provided above and the structure of FIGS. 3-6, it should be understood that it may be coded in other languages, including C++.

The principal application for the invention to date has been in simulators, which means that input 10 is not sensed but is added as a condition to the computer. In one example using the invention as a military airborne warning and control simulator (AWACS), two people were trained on an Air Force simulator to develop expertise that was used to populate the invention with appropriate cues and simulations. The invention then used these inputs to interpret situations, and had a 90% correspondence to the results of a real operator.

It should be apparent that there are many modifications possible with this invention. It is intended that the scope of the invention be defined by the appended claims.

The invention claimed is:

1. A method for computer emulation of human decision making comprising:
    defining a plurality of concepts related to a domain;
    representing each concept in the computer as a concept oscillator output;
    defining a plurality of situations related to the domain, each situation formed of at least one concept;
    representing each situation in the computer as a situation oscillator output, wherein each situation and concept oscillator output is distinguishable from all other oscillator outputs;
    inputting information to the computer representative of detected concepts;
    comparing in the computer the detected concepts with the stored situations to determine if a situation has occurred.

2. The method of claim 1 wherein each concept oscillator operates in a first frequency range when the level of activation of its concept exceeds its concept threshold, the level of activation being indicated by at least one of frequency and amplitude of the concept oscillator output.

3. The method of claim 2 wherein each situation oscillator operates in a second frequency range when the level of activation of the situation oscillator exceeds its threshold, the degree to which each situation occurs being indicated by the level of activation of at least one of frequency and amplitude of the situation oscillator output.

4. The method of claim 3 further comprising the computer determining the situation that has the greatest level of activation above its threshold, wherein that situation is considered to be the detected situation.

5. The method of claim 4 wherein the first frequency range is the bandwidth of the alpha brain wave in humans, and the second frequency range is the bandwidth of the theta brain wave in humans.

6. The method of claim 5 further comprising defining associations between pairs of concepts, each activated concept causing a change in the level of activation of associated concepts; and adjusting at least one of the frequency and amplitude of each actuated concept oscillator based on its association with another concept.

7. The method of claim 6 further comprising spreading activation to a second concept oscillator because of the activation of a first concept oscillator to which the second oscillator is associated, wherein the level of activation of the second oscillator increases because of the activation of the associated first oscillator.

8. The method of claim 7 further comprising stopping the effect of said first concept oscillator on said second concept oscillator when the activation of the first concept oscillator stops.

9. The method of claim 6 further comprising increasing the oscillation frequency of a node oscillator as the level of activation of the node increases.

10. The method of claim 6 further comprising top-down activation of associated concepts wherein recognition of a situation causes an increase in the level of activation of associated concepts.

11. The method of claim 6 further comprising representing in the computer a system oscillator operating within the alpha bandwidth, wherein the concept oscillators which are not actuated oscillate in synchronization with the system oscillator at a low amplitude.

12. The method of claim 11 further comprising updating the level of activation of each concept and situation oscillator with each cycle of the oscillator.

13. The method of claim 12 further comprising providing an indication of unexpected occurrence when a concept is actuated which is inconsistent with an actuated situation.

14. The method of claim 12 further comprising taking an action in response to a situation.

15. The method of claim 1 wherein the relationship between concepts and situations are defined by a knowledge elicitation process comprising:
   determining a list of situations and concepts related to those situations;
   defining the situations as combinations of cues; and
   determining a quantitative relationship between the cues and situations; and
   creating an associative network of cues based on semantic relationships between concept nodes.

16. The method of claim 1 wherein a plurality of subject matter experts each define cues, situations, and associations relative to a domain, and further comprising:
   forming a separate model from each expert's cues, situations, and associations;
   if at least one of these models fails to recognize a situation for the inputted information:
      determining the nodes representing concepts recognized by all experts;
      summing the sums of the levels of activation for each of said nodes in each of the models; and
      declaring a situation has occurred if said sum exceeds a predetermined threshold.

* * * * *